United States Patent [19]
Lepelletier

[11] 3,808,811
[45] May 7, 1974

[54] HYDROSTATIC UNIT WITH VARIABLE CYLINDER-CAPACITY AND TRANSMISSION INCORPORATING SAID UNIT

[75] Inventor: Pierre André Georges Lepelletier, Chatou, France

[73] Assignee: Societe Anonyme Francaise Du Ferodo, Paris, France

[22] Filed: July 31, 1972

[21] Appl. No.: 276,459

[30] Foreign Application Priority Data
Aug. 19, 1971 France .............................. 71.030191
June 6, 1972 France .............................. 72.20233

[52] U.S. Cl. ...................... 60/444, 60/462, 60/465, 60/487
[51] Int. Cl. ............................................. F16h 39/46
[58] Field of Search ............ 60/462, 465, 468, 470, 60/487, 488, 443, 444

[56] References Cited
UNITED STATES PATENTS

| | | | |
|---|---|---|---|
| 3,046,906 | 7/1962 | Budzich.............................. | 91/487 |
| 3,167,907 | 2/1965 | Kempson........................... | 60/444 X |
| 3,214,911 | 11/1965 | Kempson........................... | 60/462 X |
| 3,318,092 | 5/1967 | Boydell.............................. | 60/487 |
| 3,465,520 | 9/1969 | Hann.................................. | 60/443 |

*Primary Examiner*—Edgar W. Geoghegan
*Attorney, Agent, or Firm*—Young & Thompson

[57] ABSTRACT

The invention relates to hydrostatic units with variable cylinder-capacity comprising a shaft and a barrel coupled for rotation, a plurality of cylinders formed in said barrel and a like plurality of pistons slidably-mounted in said cylinders so as to define chambers of variable volumes adapted to co-operate with a plate centered at a pre-determined point on the axis of said shaft, one of said members (barrel and plate) being continuously coaxial with said shaft while the other member is pivotally mounted about an axis perpendicular to the axis of said shaft, so as to take-up a large number of positions more or less inclined with respect to the axis of the shaft for the purpose of forming a cylinder-capacity regulating device, said positions including a position in axial alignment with the shaft axis and corresponding to the minimum cylinder-capacity, and a control system acting on said regulating device, the pivotal axis of said device meeting the axis of said shaft at a point on the latter axis which is substantially displaced with respect to said pre-determined point, said regulating device being pivotally mounted and floating and being subjected to two oppositely-acting torques, one of which is servo-controlled by the control systems and moves the regulating device away from its position of minimum cylinder-capacity, while the other is a restoring torque resulting from the axial displacement of said two points and moving the regulating device towards its position of minimum cylinder-capacity; the units may be incorporated in the transmission systems of fork-lift trucks or automobile vehicles.

19 Claims, 9 Drawing Figures

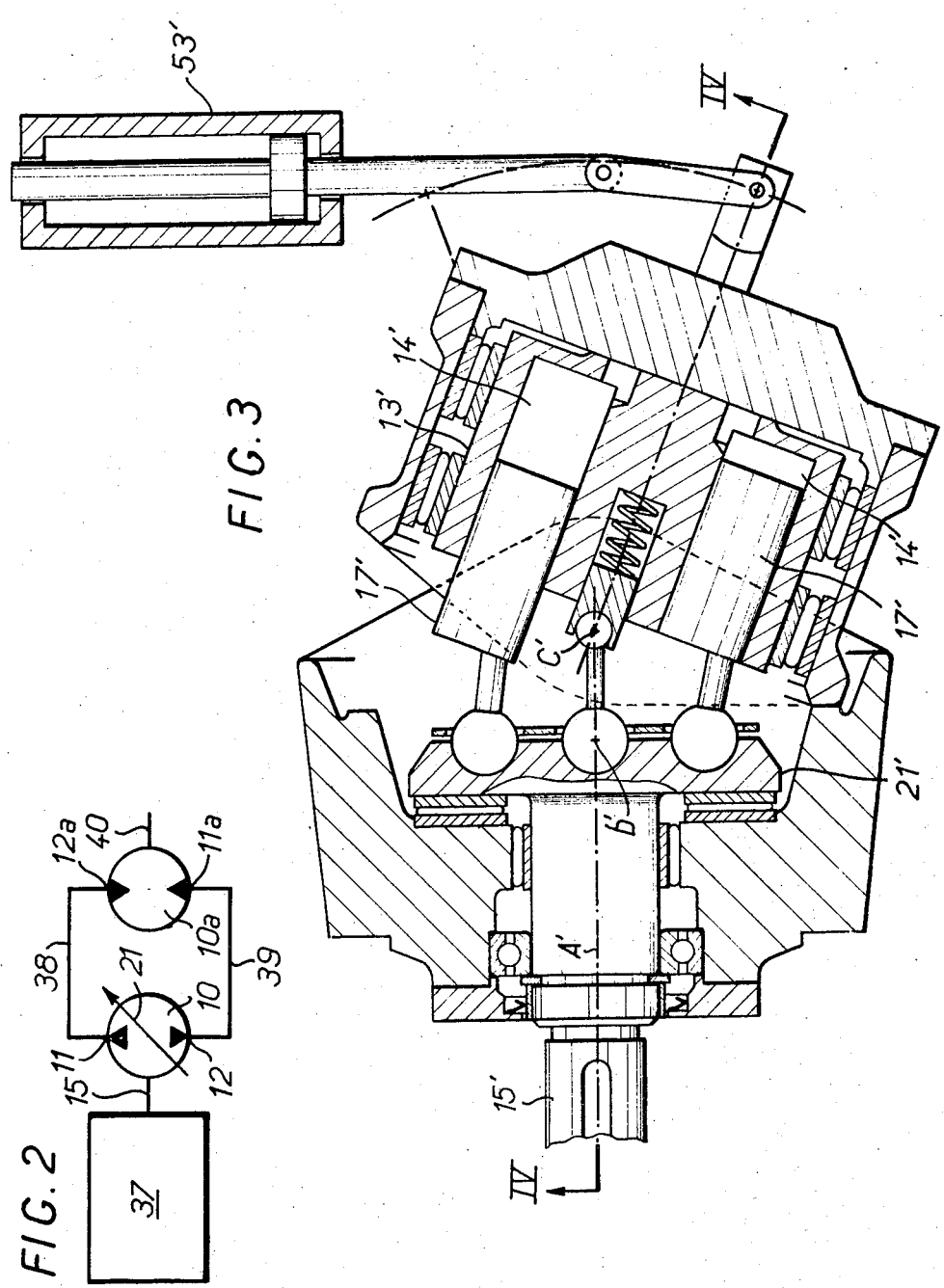

HYDROSTATIC UNIT WITH VARIABLE CYLINDER-CAPACITY AND TRANSMISSION INCORPORATING SAID UNIT

The present invention relates to a hydrostatic unit with variable cylinder capacity, comprising a shaft and a barrel coupled for rotation, pistons slidably mounted in the barrel so as to define chambers of variable volumes and co-operating with a plate in a centered manner around a pre-determined point of the axis of the shaft, one of the members barrel and plate being provided continuously coaxial with the said shaft, while the other member is pivotally mounted about a pivotal axis perpendicular to the axis of the shaft in order to be able to assume a large number of positions more or less inclined with respect to the axis of the shaft, with a view to forming a cylinder capacity regulating device, these positions comprising a position axially aligned with the axis of the shaft and corresponding to a minimum cylinder capacity.

Depending on the type of hydrostatic unit, it is the barrel which remains coaxial with the shaft, while the plate forms the pivoting regulating member, or alternatively it is the plate which remains coaxial with the shaft, while the barrel forms the pivoting regulator device.

In known hydrostatic units of variable cylinder capacity, whether they are of the pivoted plate or broken axis type, it has already been proposed to displace the point of the axis of the shaft at which is applied the resultant of the pressure forces of the pistons (which slide in the barrel so as to define chambers of variable volume) and the meeting point of the axis of the shaft and of the pivotal axis of the regulating device. This displacement is provided for the following reasons:

Reduction or elimination of vibrations;
Ease of operation of the regulator device (forces or unilateral coupling);
Definition of a so-called power regulator on a narrow range of variations of output pressure as a function of the said output flow-rate.

In all these conditions, the above displacement is such that these two points are never aligned on the axis of the shaft.

The Applicants have found that by displacing these two points on the axis of the shaft, they obtain an arrangement capable of producing on the cylinder capacity regulator device, a moment resulting from the hydraulic forces practically proportional to the driving torque of the primary shaft of the pump, this taking place in both directions of circulation of the flow on the one hand, and on the other hand for all the values of pressure and flow-rate of which the pump is capable.

This enables the regulator device to be subjected to two opposing torques, of which one is controlled in dependence on the drive and acts on the regulator member by moving away from the position of minimum cylinder capacity, while the other is a restoring torque substantially proportional to the torque developed on the shaft and thereby a modulation may be introduced which makes it possible to take account of the external conditions in order to obtain the optimum conditions of operation.

The present invention has for its object a hydrostatic unit arranged with a very simple construction so that the cylinder capacity is dependent both on the pressure and the flow-rate of delivery and of the control proper.

According to the invention, a hydrostatic unit is characterized in that the pivotal axis of the regulator device meets the axis of the shaft at a point which, along this latter axis, is appreciably displaced with respect to the said pre-determined point, the said regulator device being pivotally mounted in a floating manner by being subjected to two opposing torques, one of which is controlled in dependence on the said drive and acts on the said regulator device by moving away from the minimum cylinder capacity position, while the other is a restoring torque resulting from the said displacement of the two points and urging the said regulator device towards the position of minimum cylinder capacity, the force of the said restoring torque representing the delivery pressure, while the leverage of the said restoring torque is especially variable with the position of the regulator device and represents the cylinder capacity, so that the said restoring torque is substantially proportional to the torque developed on the shaft.

The present invention also has for its object a hydrostatic transmission between a driving shaft and a receiving shaft and having at least two units, one forming a pump and the other a motor, the delivery of the pump being coupled to the suction of the motor and vice-versa, one of the said units, preferably the pump, having a variable cylinder capacity and being arranged in the manner indicated above. This unit is hereinafter known as a unit according to the invention; the other unit has a fixed or variable cylinder capacity.

When it is desired to modify the speed of one unit and/or the other, by modification of the variable cylinder capacity of the unit according to the invention and, for that very reason, the ratio of the speeds of the driving shaft and the receiving shaft, action is made on the drive in order to vary the force which is controlled by it. The result is:

In a first time-period, a modification of the delivery pressure on which depends precisely the variable cylinder capacity;
and then, in a second time-period, when once the inertia forces present on the two shafts have been overcome, a modification of the variable cylinder capacity of the said unit according to the invention, and therefore of the ratio of the speeds.

In order to give an example, it is thus possible to obtain an optimization of the operation comparable to that which can be obtained with a hydrokinetic torque converter.

The control at the disposal of the user is in fact a display control of the accelerations and decelerations of one unit and/or the other. They offer to a vehicle equipped with such a hydrostatic transmission the full range of desirable performances. This is especially applicable, inter alia, to vehicles of the handling truck type.

Forms of embodiment of the invention are described below by way of example, reference being made to the accompanying drawings, in which:

FIG. 2 shows diagrammatically a hydrostatic transmission comprising the unit of FIGS. 1 to 4 and another unit;

FIG. 3 is a view of an alternative form in cross-section, taken along the line III—III of FIG. 4;

Figure 5:
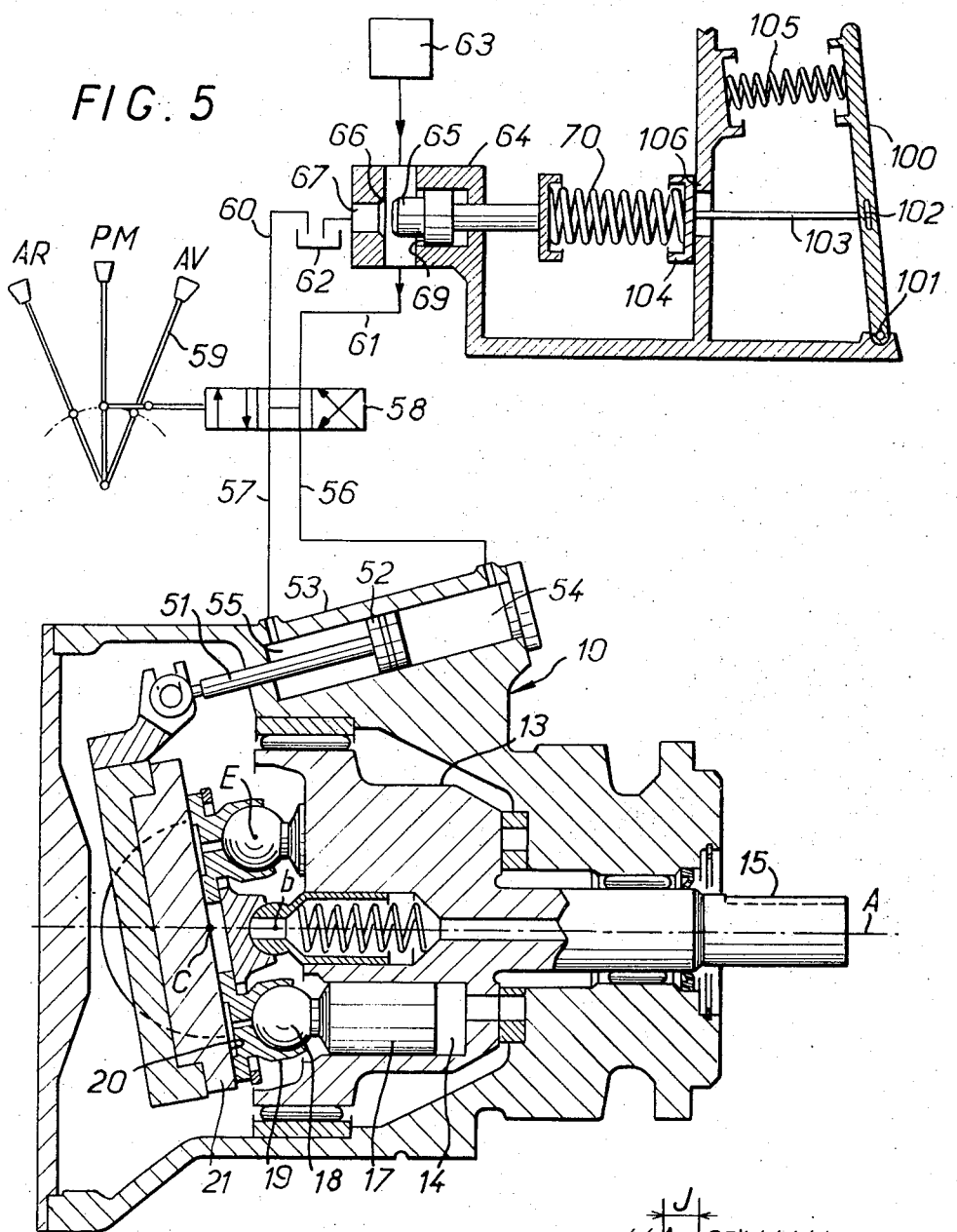
Figure 6:
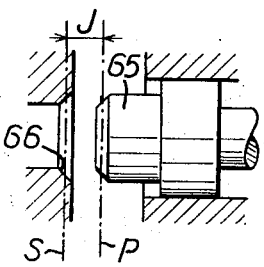
Figure 7:
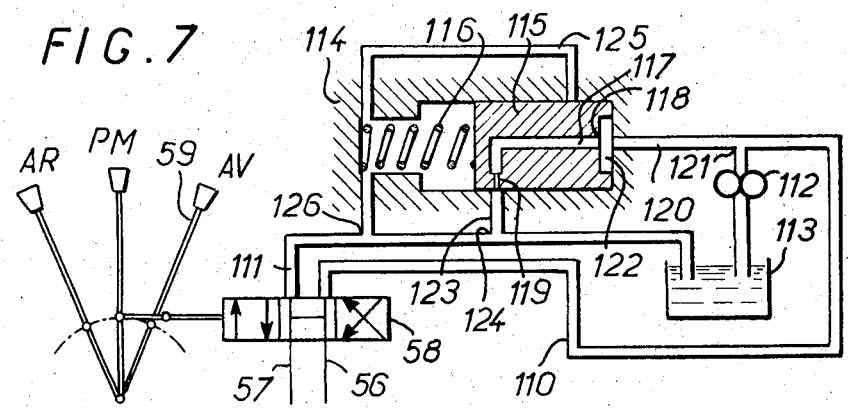
Figure 9:
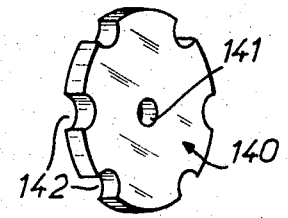
Figure 8:
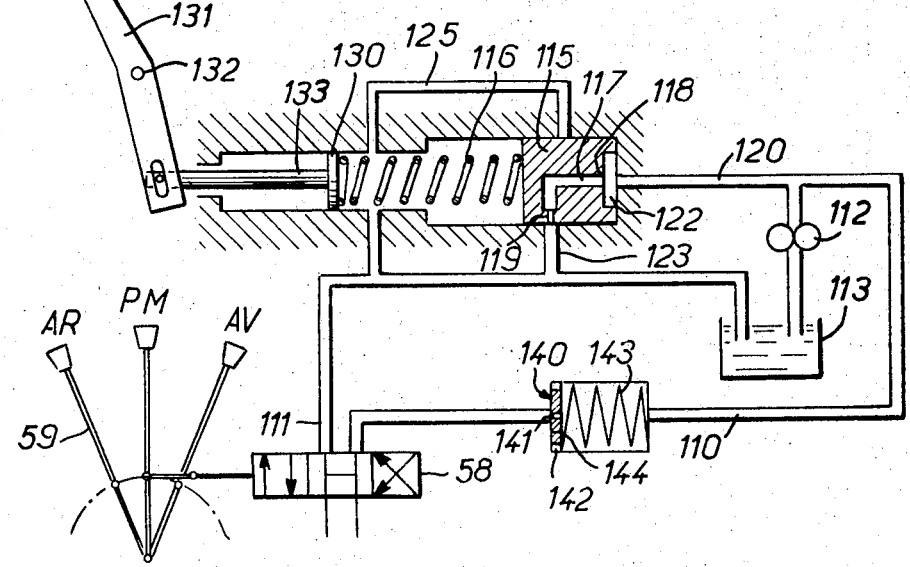

FIG. 5 relates to another alternative form;

FIG. 6 shows a detail of the control of this other alternative form;

FIGS. 7 and 8 concern respectively two further alternative forms;

FIG. 9 shows in detail and in perspective a part of FIG. 8.

Figure 1:
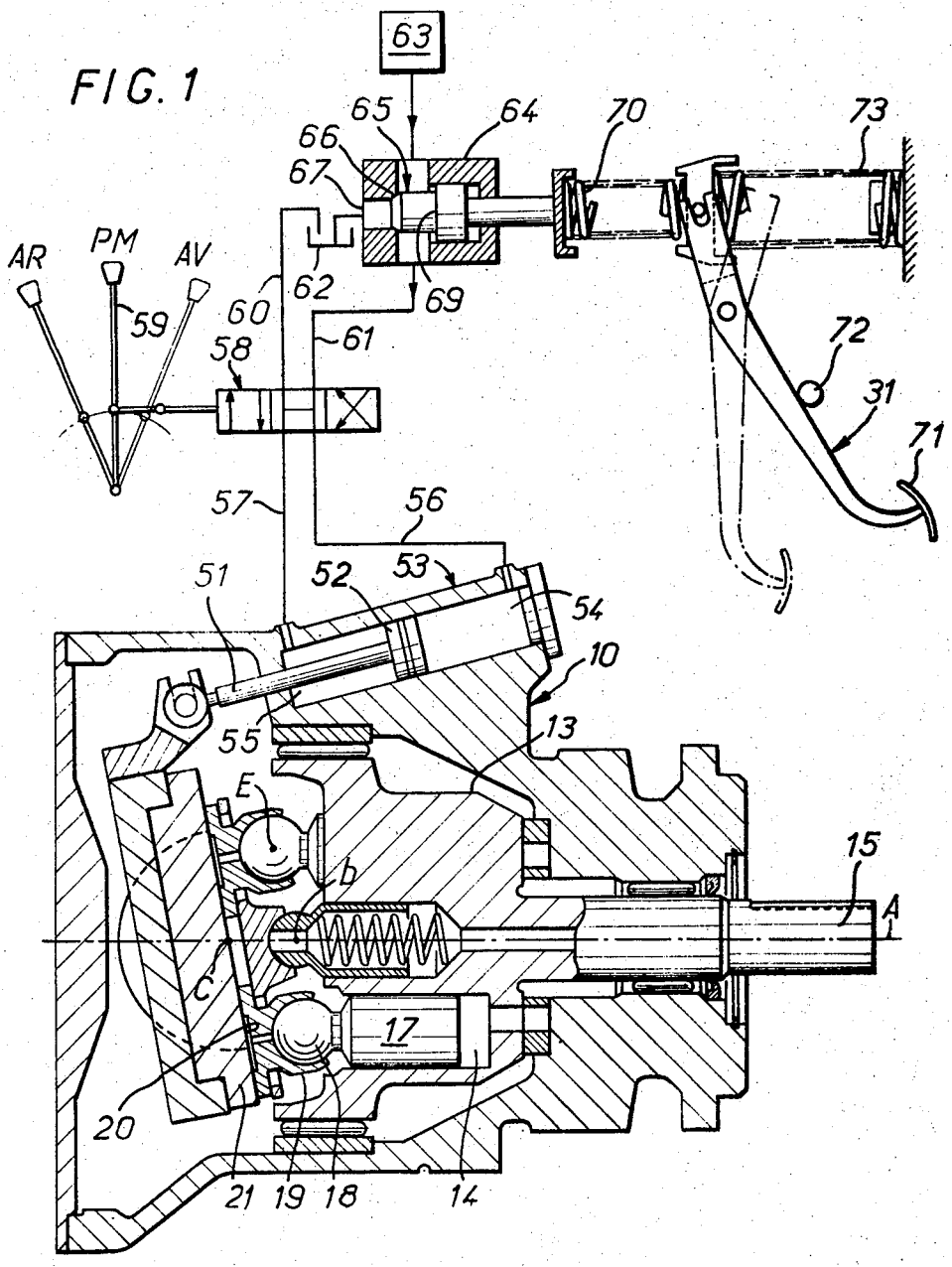
FIG. 1 is a view in vertical longitudinal sction of a hydrostatic unit according to the invention, with its control system.

Reference will first be made to FIGS. 1 and 2, in which a hydrostatic unit with variable cylinder capacity according to the invention is, by way of example, a hydrostatic pump of the type having a pivoted plate 21 which forms a regulator device for the cylinder capacity.

The hydrostatic unit comprises a fixed body 10. Fluid conveyor means are mounted movably with respect to the fixed body 10 and comprise a series of chambers 14 of variable volume, which in operation convey fluid along a cyclic path.

In the example shown, the fluid conveyor means comprise a barrel 13 mounted fixedly on a driving shaft 15 having an axis A. The barrel 13 has a plurality of cylindrical cavities parallel to the axis A and receiving pistons 17 in order to define the variable volume chambers 14.

Each piston 17 has a spherical extremity 18 engaged like a ball-joint around a centre E in a shoe 19, which is permitted to slide against a flat surface of an inclinable non-rotating plate 21 (shown inclined in FIG. 1).

The plate 21 is pivotally mounted in a pair of bearings of the fixed body 10 about an axis perpendicular to the plane of FIG. 1 and intersecting the axis at a point C.

By reason of the conditions of pressure in the chambers 14, thrusts are applied by the ball-joints 18 on the assembly 19–21 towards the left of FIG. 1.

These thrusts are perpendicular to the surface 20 and on the average are produced at points, the common projection $b$ of which, in the plane of FIG. 1, coincides continuously, irrespective of the orientation of the plate 21, with the centre of the circle defined by all the centres E of all the ball-joints 18 of all the shoes 19. C is displaced axially with respect to $b$ in the opposite direction to the chambers 14.

The cylinder capacity is increased as the inclination of the plate 21 increases. It is a minimum (equal to zero) when the plate 21 occupies a position in which the plate is perpendicular to the axis A. The plate 21 thus forms a cylinder capacity regulator device.

The regulator plate 21 is mounted floatingly along its course and is allowed to find its position of equilibrium by being subjected to two opposing torques, one of which is controlled by a control piston 52 and urges the plate 21 away from the position of minimum cylinder capacity, while the other is a restoring torque urging the said plate 21 towards the position of minimum cylinder capacity, the force of the said restoring torque being representative on the average of the delivery pressure while the leverage of the said restoring torque is substantially variable with the position of the plate 21 and is representative on the average, of the cylinder capacity, so that the said restoring torque is on the average substantially proportional to the torque developed on the shaft 15.

The piston 52 has a rod 51 coupled to the plate 21, and is slidably mounted in a double-acting hydraulic jack 53, the two chambers of which can be seen at 54 and 55. These are coupled respectively by conduits 56 and 57 to a distributor 58 having three positions, actuated by a lever 59.

This distributor is further coupled by a conduit 60 to a tank 62 and by a conduit 61 to a source of pressure 63 through the intermediary of a modulator and pressure-limiter device 64 having a discharge-valve 65. This valve co-operates with a seating 66 having an orifice 67 coupled to the tank 62 and has a bearing surface 69 exposed to the pressure in the conduit 61.

The clapper-valve 65 tends to be moved away from its seating 66 by the effect of this pressure, and tends to approach the said seating 66 by the action of a spring 70, the pre-stress of which depends on the position given by the operator to a pedal or a lever 71 forming the control 31. Starting from an abutment position at 72, the pedal may be depressed by the operator against the action of a spring 73, preponderant as compared with the spring 70.

The valve 65 discharges more towards the tank 62 of the pressure from the source 63 as the pedal 71 is further depressed. It is no longer subjected to any pressure due to the spring 70 in the maximum depressed position.

A hydrostatic unit 10 such as has been described with reference to FIG. 1 can be employed as a pump of a hydrostatic transmission, of which there is seen at 15 in FIG. 2 the shaft driven by a motor 37, at 10a a unit of fixed cylinder capacity forming a motor, at 38 and 39 hydraulic conduits for connecting the two units, joining together their orifices 11, 12a and 12, 11a, and at 40 the output shaft of the transmission. A transmission of this kind may have any appropriate applications, and may for example be applied to vehicles, especially handling trucks.

When the control 31 is employed, as previously described, action is taken on the transmission 10–10a in the desired direction of a more or less large cylinder capacity, but this cylinder capacity also depends on the delivery pressure at the instant considered, that is to say on the resistive torque developed on the output shaft 40, both by the resistances proper and by the inertia forces existing on this shaft.

This makes it possible to modulate advantageously the effect of the will of the operator, as a function of the instantaneous conditions of use, and in consequence, to obtain automatic optimization of the operation.

The right-hand position of the lever 59 (FIG. 1) in which the conduits 60 and 57 are joined and the conduits 61 and 56 are coupled together, corresponds to the forward running position AV. The central position of the lever 59 corresponds to the neutral point PM in which these conduits are all short-circuited and connected to the tank 62. The left-hand position of the lever 59 in which the conduits 60 and 56 are joined and the conduits 61 and 57 are coupled together, corresponds to the reverse position AR.

The pedal 71 plays the part of a clutch pedal.

The complete depression of the pedal 71 (position in chain-dotted lines in FIG. 1) corresponds to declutching.

The pressure from the source 63 is completely discharged at 62 and does not reach the jack 53. The plate 21 is in any position of cylinder capacity, depending solely on the respective speeds of the motor and the vehicle. The motor 37 does not drive the output shaft 40 and conversely, the shaft 40 does not drive the motor 37, whether the vehicle brakes are applied or not.

In order to carry out for example a start-up from the stopped position, the pedal 71 is released more or less towards the abutment position at 72, depending on the degree of progressivity desired. The pressure increases in one of the chambers 54 or 55 and tends to incline the plate 21 and to increase the delivery pressure. If the brakes are applied, the shaft 40 is stationary and there is no circulation of fluid at 38, 39 having an active function.

When the brakes are released, the vehicle starts-up and the circulation of oil at 38, 39 increases. The plate 21 becomes more and more inclined as and when the vehicle runs-up to speed, and the delivery pressure, at its maximum at the beginning, falls as and when this speed increases, until the maximum cylinder capacity has been reached. The unit 10 then behaves like a pump with a fixed cylinder capacity, and from then on there is a proportionality between the speeds of rotation of the driving shaft 15 and the output shaft 40.

This operation may naturally be effected at any moment under the complete control of the operator, who remains free to act on the position of the control 31 and/or by the position of acceleration of the motor 37 to impress a more or less large acceleration on his vehicle.

When the resistive couple developed on the shaft 40 increases (for example if the vehicle is climbing a slope), the delivery pressure increases and in consequence also the restoring torque of the plate 21. This takes-up a smaller inclination and enables the motor 37 to increase its operation by delivering fluid at an increased pressure but lower volume and to thus overcome the resistive torque.

It will therefore readily be understood that, even at the moment of starting-up, at which the operation may appear in all respects similar to a clutch engagement operation, this same effect is produced at any instant, but with continuous conversion of energy and all the corresponding advantages: economy, long life and reliability.

Furthermore, the transmission which has just been described permits exactly symmetrical operation as a motor brake, in which the shaft 15 is permitted to brake the shaft 40 when this latter has a tendency to be driven by an external force (for example if the vehicle is running down-hill, or is driven by its inertia).

Figure 4:
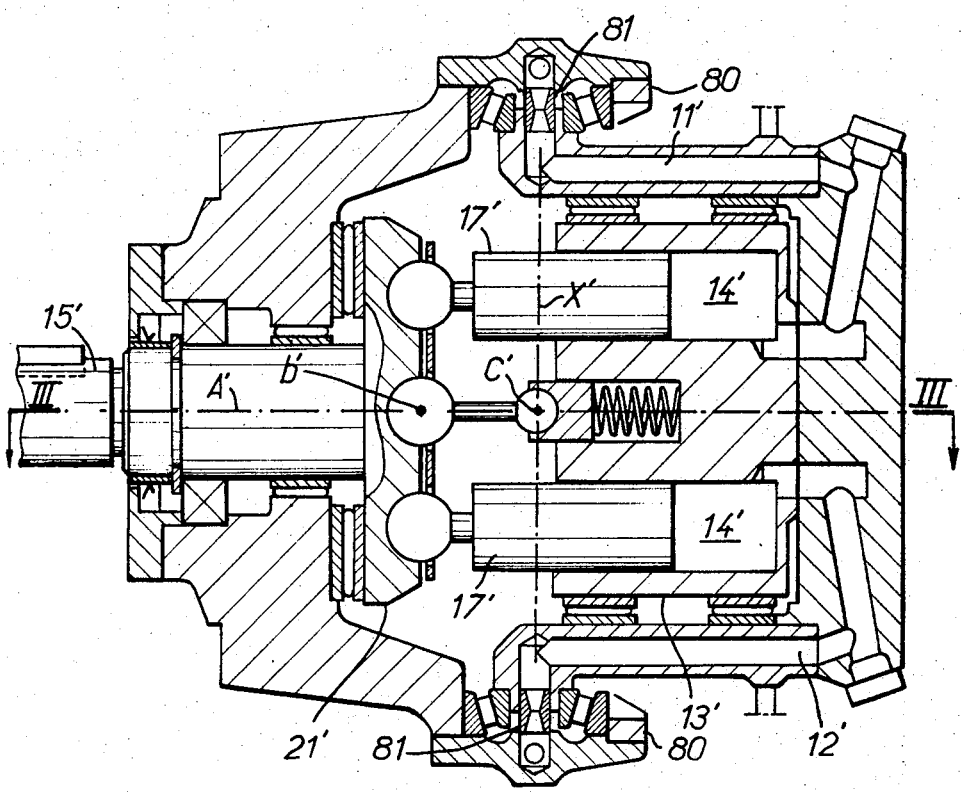
FIG. 4 is a view of this alternative form in cross-section taken along the line IV—IV of FIG. 3.

Reference will now be made to FIGS. 3 and 4, which relate to an application of the invention to a hydrostatic unit of the type with an inclinable barrel 13' and with a non-inclinable plate 21'.

There will be recognised at $b'$ and at $C'$ the points axially displaced in order to permit the restoring torque, while the torque depending on the control is ensured by the jack 53'.

The pivotal movement of the barrel 13' is ensured by two bearings 80 in which the axis X' meets the axis A' of the shaft 15' at the point C'. The suction and delivery conduits 11' and 12' which are associated with the chambers 14' of the pistons 17' pass respectively through the bearings 80 through the intermediary of rotating joints 81.

It will be observed that the displacement of $C'$ with respect to $b'$ is provided in the direction of the chambers 14'.

The operation is similar to that which has been previously described.

Reference will now be made to FIGS. 5 and 6, in which there is shown an alternative form of the control of FIG. 1.

By means of the lever 59, the distributor 58 makes it possible to put the conduits 56 and 57 in connection either respectively with two conduits 61 and 60 (forward-running position AV), or respectively with the conduits 60 and 61 (reversing position AR), or in short-circuit one on the other (neutral point position between positions AV and AR).

The conduit 60 is connected to a tank 62. The conduit 61 is connected to a source of pressure 63 through the intermediary of a modulator and pressure-limiter device 64 having a discharge valve 65. This latter cooperates with a seating 66 having an orifice 67 connected to the tank 62 and has a bearing surface 69 exposed to the pressure in the conduit 61.

The clapper-valve 65 tends to be moved away from its seating 66 by the effect of this pressure and tends to approach the said seating 66 under the action of a calibrating spring 70, the stress of which depends on the position given by the operator to an operating pedal or lever 100.

The pedal 100 is pivotally mounted about a fixed shaft 101 and is connected by a coupling 102 (FIG. 5) to a rod 103 which is rigidly fixed to a seating 104 of the calibrated spring 70. A restoring spring 105 is associated with the pedal 100, while an abutment 106 with which the seating 104 is permitted to co-operate, defines a position of rest for the pedal 100 (position shown in FIGS. 5 and 6).

In such a position of rest (FIG. 6), the contact zone P of the valve 65 is spaced apart by a pre-determined clearance J from the associated contact zone S of the seating 66.

The pedal 100 constitutes an actuating means having a travel from this position of rest (abutment of 104 on 106) towards which this actuating means is elastically urged by the spring 105. The coupling between the pedal 100 and the plate 21 which regulates the cylinder capacity is such that when the pedal 100 is left free in its position of rest, and by virtue of the clearance J, the pedal 100 has no action on the plate 21, whereas when the pedal 100 is depressed, with valve 58 in the neutral position shown in FIG. 5, the plate 21 is urged away from the position of minimum cylinder capacity and this tendency increases as the pedal 100 is farther away from its position of rest.

The unit 10 which has just been described with reference to FIGS. 5 and 6 forms a pump intended to be associated with another unit having an output shaft as shown in FIG. 2 for example, so as to form a hydrostatic transmission for a handling truck. The motor driving the shaft 15 may have a constant speed of rotation and may not have any proper accelerator control. The pedal 100 plays the part of an accelerator pedal for an output shaft of this kind.

In the position of rest, that is to say when the user does not depress the pedal 100, the discharge valve 65 is completely moved away from its seating 66. The chambers 54 and 55 of the jack 53 are then at atmospheric pressure. The transmission is released. In particular, the vehicle is permitted to remain stationary while the motor shaft 15 rotates. It is the clearance J which enables the discharge valve 65 to move completely away from its seating 66, thus ensuring an abrupt declutching action.

When the user depresses the pedal 100 more or less, he first effects a take-up of the clearance J and then a more or less high degree of stress of the spring 70, which has the consequence of developing a more or less great pressure in one or the other of the chambers 54 and 55 of the jack 53, and in consequence to engage the transmission under a more or less large torque.

It will thus be appreciated that the plate 21 finds a position of equilibrium which is a function of the force supplied on the pedal 100, which plays the part of an accelerator pedal.

In the example of FIG. 5, the pedal 100 further causes declutching or disengagement of the transmission when it is released.

It will be understood that if it is desired to avoid such disengagement, a partial opening of the valve 65 may be provided in the position of rest of the pedal 100, for example by reducing the clearance J. In this position, there will then subsist a threshold of pressure which especially gives rise to a drag. This may be driving or delaying, depending on the conditions of use.

The pedal 100 may advantageously have two stable positions of rest, in particular a position for which the transmission is completely disengaged and a position for which the transmission has a drag torque.

The motor driving the shaft 15 may have a constant speed of rotation, but it may also have a variable speed of rotation.

Reference will now be made to FIG. 7, in which the driving motor of the shaft 15 has a variable speed of rotation by being provided with an accelerator pedal or lever, while the control acting on the plate 21 is dependent on this speed of rotation.

The distributor 58 is interposed between the conduits 56 and 57 and two conduits 110 and 111.

The conduit 110 is supplied by a volumetric pump 112, the speed of rotation of which is proportional to the speed of rotation of the driving shaft 15, and which takes its suction from a tank 113. The conduit 111 is connected to the tank 113.

A discharge valve of which the fixed body is seen at 114 comprises a slide-valve 115 calibrated by a spring 116. The slide-valve 115 has an elbowed passage 117 which opens out axially at 118 with a full section and laterally at 119 with a reduced section forming a calibrated orifice.

A conduit 120 is connected at 121 to the conduit 110 coming from the pump 112, and is connected, facing the opening 118 of the conduit 117, to the chamber 122 which defines the slide-valve 115 in the body 114. A conduit 123 connected at 124 to the conduit 111 cooperates with the calibrated orifice 119, while a conduit 125 connected at 126 to the conduit 111 is permitted to communicate with the chamber 122 when the slide-valve 115 has been sufficiently depressed by the effect of the pressure at 122 against the action of the spring 116.

In the neutral position of the lever 59, the chambers 54 and 55 of the pump displacement control are in communication and no torque is applied to the plate 21 which regulates the cylinder capacity.

In one of the active positions of the lever 59, for example the forward running position, the chamber 55 is in communication with the tank 113 while the chamber 54 is in communication with the conduit 110.

When the motor is idling, the fluid delivered by the pump 112 does not create any over-pressure in the chamber 55 since it flows without substantial loss of pressure through the calibrated orifice 119 towards the tank 113. The transmission remains declutched up to a predetermined value of the speed of rotation of the motor 37, which is higher than idling speed and which depends on the calibration of the orifice 119 and of the spring 116.

When the speed of the motor reaches and exceeds this pre-determined value, the flow-rate increases in the conduit 120 and the pressure drop introduced by the calibrated orifice 119 becomes appreciable. An over-pressure is developed in the passage 117 and in the chamber 122, which displaces the slide-valve 115 towards the left in FIG. 7 against the action of the spring 116.

This over-pressure in chamber 122 is developed in the conduits 120 and 110 and hence through the valve 58 in the forward running position, in the chamber 55 while the chamber 54 is connected to the reservoir 113 via 58, 111, 124, and therefore the piston 52 applies a torque on the plate 21, which has the effect of putting the transmission under load. This putting under load is gradual since, as the slide-valve 115 is displaced, the orifice 119 is more and more masked by the body 114.

When the slide-valve 115 has moved back sufficiently to uncover the conduit 125, the chamber 122 is put into communication with the tank 113 and the whole assembly, slide-valve 115, spring 116 plays the part of a pressure-limiter and therefore a force limiter on the plate 21.

In the alternative form shown in FIG. 8, the arrangement is similar to that which has just been described with reference to FIG. 7, but the calibration of the spring 116, instead of being constant, is made variable either manually or automatically, as a function of one or more pre-determined factors.

In the example shown in FIG. 8, the spring 116 for returning the slide-valve 115 is applied against a piston 130 which is manually-operated in this case by a lever 131. This lever is pivotally mounted about an axis 132 and acts on a rod 133 fixed on the piston 130. The lever 131 permits more or less force to be applied to the spring 116. The travel of the piston 130 is provided long enough so as to permit the spring 116 to be completely expanded irrespective of the position of the slide-valve 115, in such manner as to render the putting under load of the plate 21 impossible, at any speed of rotation of the motor 37.

The action on the spring 116 may be other than manual. For example, in the case of a handling truck with lift, the calibration of the spring 116 may advantageously correspond to the height of the lifting device, in order to reduce, for the purposes of safety, the maximum acceleration of the truck, all the more that the lifting device is in the top position and, especially, to go up to the prohibition in certain cases of any forward movement of the truck in the highest position of the lifting device.

In another example, an action on the spring 116 may be applied in order to introduce different conditions of working, depending on whether the actual condition is one of traction or of motor brake.

In another alternative form (not shown) instead of modifying the calibration of a single device 115–116, there may be provided two such devices which are calibrated differently and which are brought into use in turn, depending on the conditions desired.

In addition, in the form of embodiment shown in FIG. 8, means are provided for introducing an asymmetry between on the one hand the conditions of application or of increase of the torque developed on the plate 21, and on the other hand the conditions of diminution or elimination of this torque. To this end, as shown in FIGS. 8 and 9, a member 140 is provided in order to facilitate the return of the plate 21 towards the position of minimum cylinder capacity.

In the example shown in FIGS. 8 and 9, the member 140 is arranged in the supply conduit 110, and consists of a disc having a small central drilled hole 141 and peripheral slots 142. The disc 140 is urged by a spring 143 into application against a seating 144 where the peripheral slots 142 are masked.

During those conditions of operation where torque developed on the plate 21 is increased, the fluid flows from conduit 120 via conduit 110, disc 140 and valve 58 to cylinder 53 and at the same time the fluid flows from cylinder 53, valve 58 and conduit 111 to reservoir 113. Thus the disc 140 is urged against the seating 144 and the fluid flow is reduced due to forced passage through the small orifice 141. The operation in these conditions therefore is rendered advantageously smmoth and progressive.

On the contrary when torque developed on the plate 21 is decreased, fluid is forced from cylinder 53 via valve 58, disc 140 and conduit 110 towards conduit 120, thus causing the lifting of the disc 140 which uncovers the slots 142 and a large fluid flow is obtained. The operation therefore is more rapid. This has an advantage in particular in the use of the motor brake.

It will be noted that by placing the member 140 in the conduit 110, advantage is taken of its effect on forward running as well as its effect on reverse running.

It will be appreciated that the asymmetry means 140 are applicable not only to the form of embodiment shown in FIG. 8, but also to various forms of embodiment previously described.

What I claim is:

1. A hydrostatic unit with a variable cylinder capacity, comprising a shaft and a barrel coupled together for rotation, a plurality of cylinders formed in said barrel and a like plurality of pistons slidably mounted in said cylinders so as to define chambers of variable volumes, adapted to cooperate with a plate centered on a predetermined point on the axis of said shaft, one of said barrel and plate members being made continuously coaxial with said shaft while the other member is pivotally mounted about an axis perpendicular to the axis of said shaft, so as to be capable of taking-up a large number of positions more or less inclined with respect to the axis of said shaft for the purpose of forming a cylinder-capacity regulator device, said positions including a position in axial alignment with the axis of said shaft and corresponding to the minimum cylinder capacity, and a control system adapted to act on said regulator device, the pivotal axis of said device meeting the axis of said shaft at a point on said latter axis which is substantially displaced with respect to said predetermined point, said regulator device being pivotally mounted in a floating manner and being subjected to two oppositely acting torques, one of which is servo-controlled by said control system and urges said regulator device away from its position of minimum cylinder capacity, while the other is a restoring torque resulting from the axial displacement of said two points and urging said regulator device towards its position of minimum cylinder capacity, the force of said restoring torque representing the delivery pressure while the leverage of said restoring torque is substantially variable with the position of said regulator device and represents the cylinder-capacity, so that said restoring torque is substantially proportional to the torque developed on said shaft, the torque servo-controlled by said control system and applied to said regulator device being developed by a fluid jack conditioned by a discharge valve having a calibration which depends on said control system, said control system comprising a lever associated with two oppositely-acting springs, one of which is weaker than the other and is adapted to cooperate with said discharge-valve.

2. A hydrostatic unit with a variable cylinder capacity, comprising a shaft and a barrel coupled together for rotation, a plurality of cylinders formed in said barrel and a like plurality of pistons slidably mounted in said cylinders so as to define chambers of variable volumes, adapted to cooperate with a plate centered on a predetermined point on the axis of said shaft, one of said barrel and plate members being made continuously coaxial with said shaft while the other member is pivotally mounted about an axis perpendicular to the axis of said shaft, so as to be capable of taking-up a large number of positions more or less inclined with respect to the axis of said shaft for the purpose of forming a cylinder-capacity regulator device, said positions including a position in axial alignment with the axis of said shaft and corresponding to the minimum cylinder capacity, and a control system adapted to act on said regulator device, the pivotal axis of said device meeting the axis of said shaft at a point on said latter axis which is substantially displaced with respect to said predetermined point, said regulator device being pivotally mounted in a floating manner and being subjected to two oppositely acting torques, one of which is servo-controlled by said control system and urges said regulator device away from its position of minimum cylinder capacity, while the other is a restoring torque resulting from the axial displacement of said two points and urging said regulator device towards its position of minimum cylinder capacity, the force of said restoring torque representing the delivery pressure while the leverage of said restoring torque is substantially variable with the position of said regulator device and represents the cylinder-capacity, so that said restoring torque is substantially proportional to the torque developed on said shaft, the travel of said regulator device comprising two extreme positions which correspond to the maximum cylinder capacity, one in one direction and the other in the other direction, and towards which said torque servo-controlled by said control system urges said regulator device, while the position of minimum cylinder capacity towards which the restoring torque urges said regulator device is an intermediate position between the two said extreme positions.

3. A hydrostatic unit with a variable cylinder capacity, comprising a shaft and a barrel coupled together for rotation, a plurality of cylinders formed in said barrel and a like plurality of pistons slidably mounted in said cylinders so as to define chambers of variable volumes, adapted to cooperate with a plate centered on a predetermined point on the axis of said shaft, one of said barrel and plate members being made continuously coaxial with said shaft wyile the other member is pivotally mounted about an axis perpendicular to the axis of said shaft, so as to be capable of taking-up a large number of positions more or less inclined with respect to the axis of said shaft for the purpose of forming a cylinder-capacity regulator device, said positions including a position in axial alignment with the axis of said shaft and corresponding to the minimum cylinder capacity, a control system adapted to act on said regulator device, the pivotal axis of said device meeting the axis of said shaft at a point on said latter axis which is substantially displaced with respect to said pre-determined point, said regulator device being pivotally mounted in a floating manner and being subjected to two oppositely acting torques, one of which is servo-controlled by said control system and urges said regulator device away from its position of minimum cylinder capacity, while the other is a restoring torque resulting from the axial displacement of said two points and urging said regulator device towards its position of minimum cylinder capacity, the force of said restoring torque representing the delivery pressure while the leverage of said restoring torque is substantially variable with the position of said regulator device and represents the cylinder-capacity, so that said restoring torque is substnatially proportional to the torque developed on said shaft, said control system comprising an actuating means having a travel from at least one position of rest towards which it is urged elastically, and a coupling between said actuating means and said cylinder capacity regulator device, such that when said actuating means is left free in its position of rest, said means has no action on the cylinder-capacity regulator device, while when said actuating means moves along its travel away from its position of rest, said cylinder-capacity regulator device is urged to move away from its position of minimum cylinder-capacity, all the more as the said actuating means is farther from its position of rest.

4. A hydrostatic unit as claimed in claim 3, in which said actuating means is a pedal operated by a return spring in the position of rest and coupled to a discharge valve through the intermediary of a calibrated spring which determines the calibration of this valve as a function of the position of said pedal, said discharge valve being associated with a fluid jack adapted to act on the cylinder-capacity regulator device.

5. A hydrostatic unit as claimed in claim 4, in which said pedal has a position of rest which is defined by a stop member, and in which said valve is spaced apart from its seating by a predetermined clearance.

6. A hydrostatic unit with a variable cylinder capacity, comprising a shaft and a barrel coupled together for rotation, a plurality of cylinders formed in said barrel and a like plurality of pistons slidably mounted in said cylinders so as to define chambers of variable volumes, adapted to cooperate with a plate centered on a predetermined point on the axis of said shaft, one of said barrel and plate members being made continuously coaxial with said shaft while the other member is pivotally mounted about an axis perpendicular to the axis of said shaft, so as to be capable of taking-up a large number of positions more or less inclined with respect to the axis of said shaft for the purpose of forming a cylinder-capacity regulator device, said positions including a position in axial aligment with the axis of said shaft and corresponding to the minimum cylinder capacity, and a control system adapted to act on said regulator device, the pivotal axis of said device meeting the axis of said shaft at a point on said latter axis which is substantially displaced with respect to said predetermined point, said regulator device being pivotally mounted in a floating manner and being subjected to two oppositely acting torques, one of which is servo-controlled by said control system and urges said regulator device away from its position of minimum cylinder capacity, while the other is a restoring torque resulting from the axial displacement of said two points and urging said regulator device towards its position of minimum cylinder capacity, the force of said restoring torque representing the delivery pressure while the leverage of said restoring torque is substantially variable with the position of said regulator device and represents the cylinder-capacity, so that said restoring torque is substantially proportional to the torque developed on said shaft, said unit being associated with a motor having a variable speed of rotation, said control system being servo-controlled by the speed of rotation of said motor, said control system comprising a fluid jack associated on the one hand with a volumetric pump having a speed of rotation proportional to the speed of rotation of the motor, and on the other hand with a calibrated discharge valve servo-controlled by the delivery pressure of said pump.

7. A hydrostatic unit as claimed in claim 6, in which said discharge valve comprises a slide-valve subjected to the opposing action of a calibrated spring and the delivery pressure of said pump, said discharge valve being mounted movably between a position of rest in which said pump is permitted to deliver to a tank with a loss of pressure, and a working position in which said pump is permitted to deliver to said tank without loss of pressure or with a lower loss of pressure.

8. A hydrostatic unit as claimed in claim 6, in which the calibration of said discharge valve is constant.

9. A hydrostatic unit as claimed in claim 6, in which the calibration of said discharge valve is variable.

10. A hydrostatic unit as claimed in claim 9, in which the calibration of said discharge valve is regulated manually.

11. A hydrostatic unit as claimed in claim 9, in which the calibration of said discharge valve is adapted to be varied in dependence on a predetermined factor.

12. A hydrostatic unit as claimed in claim 11, in which said unit is applied to a transmission member of an automobile vehicle, said predetermined factor being the direction of transmission of torque, either on traction or on motor brake.

13. A hydrostatic unit as claimed in claim 2, in which the torque servo-controlled by said control system and applied to said regulator device is developed by an elastic means the stress of which depends on said control system.

14. A hydrostatic unit as claimed in claim 2, in which said minimum cylinder-capacity is a zero cylinder-capacity.

15. A hydrostatic unit as claimed in claim 2, in which said barrel is continuously coaxial with the shaft while said plate constitutes the pivoted regulator device, said displacement with respect to said predetermined point along the axis of said shaft is made in the direction opposite to said piston chambers.

16. A hydrostatic unit as claimed in claim 2, in which said plate is continuously coaxial with said shaft, while the barrel forms said pivoted regulator device, said displacement with respect to the predetermined point along the axis of said shaft being provided in the direction of said piston chambers.

17. A hydrostatic unit as claimed in claim 2, in which said control system comprises a pump and a jack, and an asymmetry device in which the pressure loss is different according to the direction of circulaion of the fluid, being interposed between said pump and said jack.

18. A hydrostatic unit as claimed in claim 17, in which said asymmetry device is mounted in the delivery of said pump.

19. A hydrostatic transmission comprising, between a driving shaft and a receiving shaft, at least two hydrostatic units at least one of which is a unit as claimed in claim 2, one of said units comprising a pump and the other of said units comprising a motor, the delivery of said pump being coupled to the suction of said motor and vice versa.

* * * * *